US009634533B2

(12) United States Patent
Uchitani et al.

(10) Patent No.: US 9,634,533 B2
(45) Date of Patent: Apr. 25, 2017

(54) MOTOR WITH A STATOR HAVING FOUR SEPARATE CORNER BOBBINS/INSULATORS AND MOLDED RESIN INSULATION AROUND TOOTH COMPLETELY ENCLOSING THE COIL AND MANUFACTURING METHOD THEREOF

(75) Inventors: Yoshihiro Uchitani, Kyoto (JP); Yuji Tanaka, Kyoto (JP); Tomoyoshi Yokogawa, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 438 days.

(21) Appl. No.: 14/344,405

(22) PCT Filed: Sep. 14, 2012

(86) PCT No.: PCT/JP2012/005880
§ 371 (c)(1),
(2), (4) Date: Mar. 12, 2014

(87) PCT Pub. No.: WO2013/042342
PCT Pub. Date: Mar. 28, 2013

(65) Prior Publication Data
US 2015/0008769 A1    Jan. 8, 2015

(30) Foreign Application Priority Data

Sep. 19, 2011   (JP) ................ 2011-203923

(51) Int. Cl.
*H02K 9/22*   (2006.01)
*H02K 3/34*   (2006.01)
(Continued)

(52) U.S. Cl.
CPC .............. *H02K 3/345* (2013.01); *H02K 3/30* (2013.01); *H02K 3/522* (2013.01); *H02K 9/22* (2013.01);
(Continued)

(58) Field of Classification Search
CPC .... H02K 15/0012; H02K 15/10; H02K 15/08; H02K 15/04; H02K 15/12; H02K 3/30;
(Continued)

(56) References Cited

U.S. PATENT DOCUMENTS 3,339,097 A * 8/1967 Dunn ................. H02K 3/522
29/596
6,509,665 B1 * 1/2003 Nishiyama ............ H02K 9/22
310/194
(Continued)

FOREIGN PATENT DOCUMENTS

JP    2005-012861 A    1/2005
JP    2006-042500 A    2/2006
(Continued)

OTHER PUBLICATIONS

Official Communication issued in International Patent Application No. PCT/JP2012/005880, mailed on Dec. 18, 2012.

*Primary Examiner* — Dang Le
*Assistant Examiner* — Maged Almawri
(74) *Attorney, Agent, or Firm* — Keating & Bennett, LLP

(57) ABSTRACT

A stationary portion of a motor includes resin bodies including an inner resin portion and an outer resin portion. The inner resin portion is between a tooth and a coil and between the tooth and an insulator. The outer resin portion covers circumferentially outer sides and axially outer sides of the coil. The inner and outer resin portions are continuous with each other through a connecting resin portion. The insulator includes an opening portion extending along circumferential side surfaces of the tooth. The inner resin portion is in contact with the circumferential side surfaces of the tooth and a conducting wire in the opening portion. Heat generated in the coil is transferred to the tooth through the resin body. A path along which the heat is transferred from the coil to the tooth is secured, and dissipation of heat out of the motor is promoted.

16 Claims, 14 Drawing Sheets

(51) Int. Cl.
  *H02K 3/52* (2006.01)
  *H02K 3/30* (2006.01)
  *H02K 15/08* (2006.01)
  *H02K 1/14* (2006.01)
  *H02K 15/02* (2006.01)

(52) U.S. Cl.
  CPC ............ *H02K 15/08* (2013.01); *H02K 1/148* (2013.01); *H02K 15/022* (2013.01); *H02K 2213/12* (2013.01); *Y10T 29/49009* (2015.01)

(58) Field of Classification Search
  CPC .......... H02K 3/34; H02K 3/325; H02K 3/345; H02K 3/32; H02K 3/46; H02K 3/40; H02K 5/08; H02K 2203/12
  USPC ..... 310/43, 215, 216.105, 214, 194; 29/596, 29/598
  See application file for complete search history.

(56) References Cited

U.S. PATENT DOCUMENTS

| | | | | |
|---|---|---|---|---|
| 6,870,292 | B2* | 3/2005 | Owada | H02K 3/24 310/194 |
| 8,097,995 | B2 | 1/2012 | Iizuka et al. | |
| 8,754,562 | B2* | 6/2014 | Platon | H01F 27/23 310/215 |
| 2003/0098630 | A1* | 5/2003 | Owada | H02K 3/24 310/194 |
| 2005/0012413 | A1* | 1/2005 | Bott | H02K 3/522 310/71 |
| 2007/0222324 | A1* | 9/2007 | Fukui | H02K 3/522 310/215 |
| 2009/0189474 | A1* | 7/2009 | van Heyden | H02K 3/522 310/195 |
| 2010/0188181 | A1* | 7/2010 | Urano | H02K 3/522 336/198 |
| 2010/0213784 | A1* | 8/2010 | Iizuka | H02K 1/148 310/208 |
| 2010/0275436 | A1* | 11/2010 | Kiyono | H02K 15/12 29/596 |
| 2012/0286619 | A1* | 11/2012 | Tsuiki | H02K 3/522 310/215 |
| 2013/0020885 | A1* | 1/2013 | Hsieh | H02K 5/128 310/43 |
| 2013/0193800 | A1* | 8/2013 | Yokogawa | H02K 3/345 310/215 |

FOREIGN PATENT DOCUMENTS

| | | |
|---|---|---|
| JP | 2007-124820 A | 5/2007 |
| JP | 2007-267463 A | 10/2007 |
| JP | 2008-283730 A | 11/2008 |
| JP | 2010-028914 A | 2/2010 |

* cited by examiner

MOTOR WITH A STATOR HAVING FOUR SEPARATE CORNER BOBBINS/INSULATORS AND MOLDED RESIN INSULATION AROUND TOOTH COMPLETELY ENCLOSING THE COIL AND MANUFACTURING METHOD THEREOF

BACKGROUND OF THE INVENTION

1. Field of the Invention

The present invention relates to a motor and a method of manufacturing the motor.

2. Description of the Related Art

In a known motor, an insulator made of a resin is attached to each tooth of a stator and a conducting wire is wound around the insulator to define a coil. The insulator is arranged to intervene between the tooth and the coil to provide electrical insulation therebetween. A known motor including such an insulator is described, for example, in JP-A 2005-012861.

During driving of the motor, heat is generated in each coil because of a drive current. It is desirable that the heat generated in the coil should be transmitted out of the motor through, for example, the insulator and the tooth. However, there are a great number of minute gaps between the tooth and the coil, and these gaps constitute a factor in preventing the heat from being effectively transferred from the coil to the tooth. When transmission of the heat from the coil is insufficient, the motor may easily become overheated.

Concerning this point, JP-A 2005-012861 describes a technique of defining a plurality of holes in the insulator and injecting a resin into each hole (see paragraph [0020] of JP-A 2005-012861). The technique of JP-A 2005-012861 enables heat to be transferred from a stator winding to a magnetic pole tooth through the resin arranged in each hole (see paragraph [0021] of JP-A 2005-012861).

However, according to the technique of JP-A 2005-012861, the resin is injected individually into each of the holes defined in the insulator. Therefore, the resins injected into the individual holes are unconnected with each other. Therefore, according to a structure of JP-A 2005-012861, there are only a limited number of paths along which the heat is transferred from the coil to the tooth, and it is thus difficult to further improve heat dissipation efficiency of the motor.

In There has been an increasing demand for small-sized and high-power motors in recent years. Accordingly, there is a demand for a structure that enables heat to be emitted out of a motor more efficiently than in the past.

SUMMARY OF THE INVENTION

Preferred embodiments of the present invention provide a technique that enables heat to be transferred from a coil to a tooth efficiently to achieve an improvement in heat dissipation efficiency of a motor.

A motor according to a preferred embodiment of the present invention includes a stationary portion and a rotating portion. The stationary portion includes a plurality of teeth, insulators, and coils. Each of the teeth preferably has the shape of a column extending in a radial direction with respect to a central axis extending in a vertical direction, and includes a pair of circumferential side surfaces extending in an axial direction. Each insulator is arranged to cover portions of a surface of a separate one of the teeth. Each coil is defined by a conducting wire wound around a separate one of the insulators. The rotating portion is arranged radially inward of the teeth, the insulators, and the coils, and is supported to be rotatable about the central axis with respect to the stationary portion. Each insulator includes an upper frame portion, a lower frame portion, and an opening portion. The upper frame portion is arranged to cover a pair of upper corner portions of a corresponding one of the teeth, each upper corner portion extending in the radial direction. The lower frame portion is arranged to cover a pair of lower corner portions of the corresponding tooth, each lower corner portion extending in the radial direction. The opening portion is arranged to extend along the circumferential side surfaces of the corresponding tooth below the upper frame portion and above the lower frame portion. The stationary portion further includes resin bodies defined integrally with one another as a single monolithic member, each resin body including an inner resin portion, an outer resin portion, and a connecting resin portion. The inner resin portion is arranged between a corresponding one of the teeth and a corresponding one of the coils, and between the corresponding tooth and a corresponding one of the insulators. The outer resin portion is arranged to cover circumferentially outer sides and axially outer sides of the corresponding coil. The connecting resin portion is arranged on a radially outer side or a radially inner side of the corresponding coil. The inner and outer resin portions are arranged to be continuous with each other through the connecting resin portion. The inner resin portion is arranged to be in contact with both the circumferential side surfaces of the corresponding tooth and the conducting wire in the opening portion.

According to the above-described preferred embodiment of the present invention, heat generated in each coil is allowed to be transferred to the tooth through the resin body. In particular, the inner resin portion is arranged between the tooth and the coil and between the tooth and the insulator. In addition, the coil is arranged to be in contact with the outer resin portion as well. Thus, a large area of a path along which the heat is transferred from the coil to the tooth is secured. Dissipation of heat out of the motor is thus promoted. Moreover, the inner and outer resin portions are arranged to be continuous with each other through the connecting resin portion. This makes it easy to mold the resin body.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a vertical direction is defined as a direction in which a central axis of a motor extends, and the shape of each member or portion and relative positions of different members or portions will be described based on this assumption. It should be noted, however, that the above definition of the vertical direction is made simply for the sake of convenience in description, and should not be construed to restrict in any way the orientation of a motor according to any of the preferred embodiments of the present invention when in actual use.

First Preferred Embodiment

Figure 1:
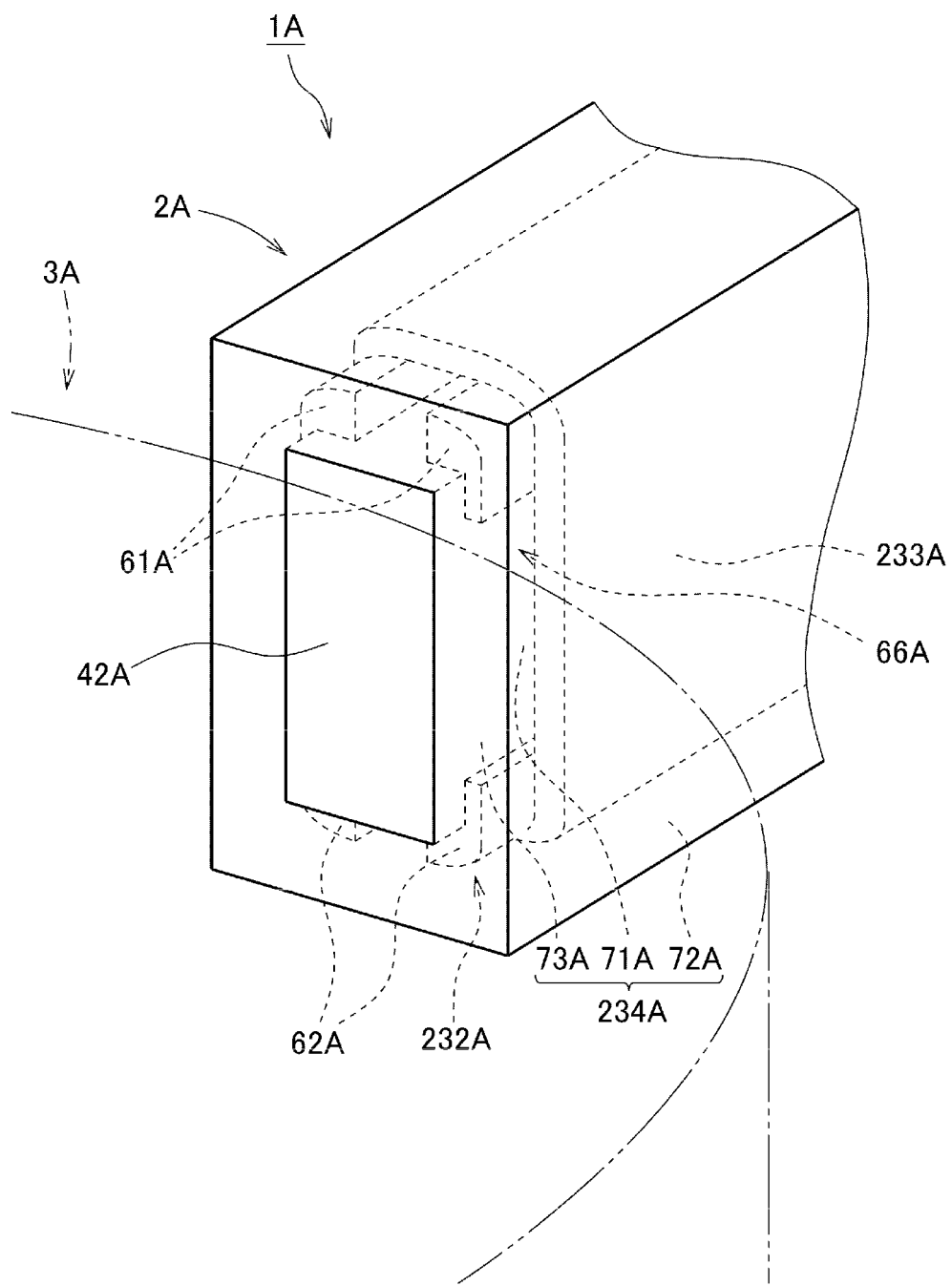
FIG. 1 is a partial perspective view of a portion of a motor according to a preferred embodiment of the present invention.

FIG. 1 is a partial perspective view of a portion of a motor 1A according to a preferred embodiment of the present invention. As illustrated in FIG. 1, the motor 1A includes a stationary portion 2A and a rotating portion 3A. The rotating portion 3A is supported to be rotatable about a central axis with respect to the stationary portion 2A.

The stationary portion 2A preferably includes a plurality of teeth 42A, insulators 232A, and coils 233A. Each of the teeth 42A is preferably arranged to have the shape of a column extending in a radial direction with respect to the central axis, and includes a pair of circumferential side surfaces extending in an axial direction. Each insulator 232A is arranged to cover portions of a surface of a separate one of the teeth 42A. Each coil 233A is defined by a conducting wire wound around a separate one of the insulators 232A. The rotating portion 3A is arranged radially inward of the teeth 42A, the insulators 232A, and the coils 233A.

Each insulator 232A preferably includes an upper frame portion 61A and a lower frame portion 62A. The upper frame portion 61A is arranged to cover a pair of upper corner portions of a corresponding one of the teeth 42A, each of the upper corner portions extending in the radial direction. The lower frame portion 62A is arranged to cover a pair of lower corner portions of the corresponding tooth 42A, each of the lower corner portions extending in the radial direction. In addition, the insulator 232A includes an opening portion 66A defined below the upper frame portion 61A and above the lower frame portion 62A. The opening portion 66A is arranged to extend along the circumferential side surfaces of the tooth 42A.

The stationary portion 2A preferably further includes resin bodies 234A defined integrally with one another as a single monolithic member. Each of the resin bodies 234A preferably includes an inner resin portion 71A, an outer resin portion 72A, and a connecting resin portion 73A. The inner resin portion 71A is arranged between the tooth 42A and the coil 233A, and between the tooth 42A and the insulator 232A. The outer resin portion 72A is arranged to cover circumferentially outer sides and axially outer sides of the coil 233A. The connecting resin portion 73A is arranged on a radially outer side or a radially inner side of the coil 233A.

The inner and outer resin portions 71A and 72A are arranged to be continuous with each other through the connecting resin portion 73A. The inner resin portion 71A is arranged to be in contact with both the circumferential side surfaces of the tooth 42A and the conducting wire defining the coil 233A in the opening portion 66A of the insulator 232A.

In the motor 1A, heat generated in each coil 233A is transferred to the tooth 42A through the resin body 234A. In particular, the inner resin portion 71A is arranged between the tooth 42A and the coil 233A and between the tooth 42A and the insulator 232A. In addition, the coil 233A is arranged to be in contact with the outer resin portion 72A as well. Thus, a large area of a path along which the heat is transferred from the coil 233A to the tooth 42A is secured. Dissipation of heat out of the motor 1A is thus promoted. Furthermore, the inner and outer resin portions 71A and 72A are arranged to be continuous with each other through the connecting resin portion 73A. This makes it easy to mold the resin body 234A.

Second Preferred Embodiment

Next, a second preferred embodiment of the present invention will now be described below.

A motor 1 according to the present preferred embodiment is preferably, for example, installed in an automobile and used to generate a driving force for a steering system. Note, however, that motors according to other preferred embodiments of the present invention may be used for other known purposes, and are not limited to motors for power steering systems. For example, a motor according to a preferred embodiment of the present invention may be used as a driving source for another component of the automobile, e.g., a fan used for engine heat dissipation. Also, motors according to preferred embodiments of the present invention may be installed in household electrical appliances, office automation appliances, medical appliances, and so on, and used to generate a variety of driving forces.

Figure 2:
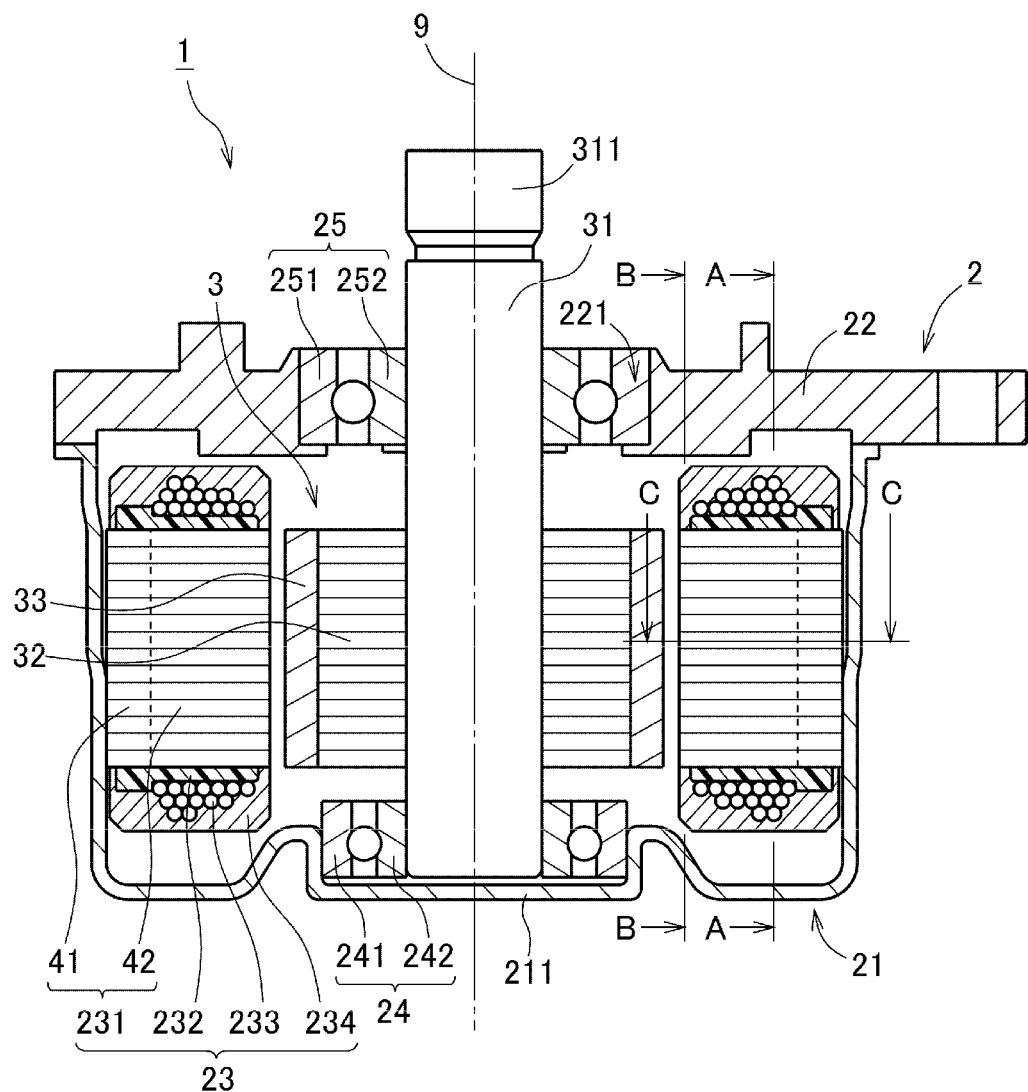
FIG. 2 is a vertical cross-sectional view of a motor according to a preferred embodiment of the present invention.

FIG. 2 is a vertical cross-sectional view of the motor 1 according to the present preferred embodiment. As illustrated in FIG. 2, the motor 1 includes a stationary portion 2 and a rotating portion 3. The stationary portion 2 preferably is fixed to a frame of an apparatus for which the motor 1 is to be driven. The rotating portion 3 is supported to be rotatable about a central axis 9 with respect to the stationary portion 2.

The stationary portion 2 according to the present preferred embodiment preferably includes a housing 21, a lid portion 22, a stator unit 23, a lower bearing portion 24, and an upper bearing portion 25.

The housing 21 is preferably arranged in or substantially in the shape of a cylinder with a bottom. The lid portion 22 is preferably arranged in or substantially in the shape of a plate, and is arranged to cover an upper opening of the housing 21. The stator unit 23, the lower bearing portion 24, a rotor core 32, and a plurality of magnets 33 are preferably accommodated in an interior space enclosed by the housing 21 and the lid portion 22. The rotor core 32 and the magnets 33 will be described below. A lower surface of the housing 21 includes a recessed portion 211 defined in a center thereof. The recessed portion 211 is arranged to hold the lower bearing portion 24. The lid portion 22 preferably includes a circular hole 221 defined in a center thereof. The circular hole 221 is arranged to hold the upper bearing portion 25.

The stator unit 23 is arranged to function as an armature to generate magnetic flux in accordance with electrical drive currents. The stator unit 23 preferably includes a stator core 231, insulators 232, coils 233, and resin bodies 234. The resin bodies 234 are preferably defined integrally with one another as a single monolithic member.

Figure 3:
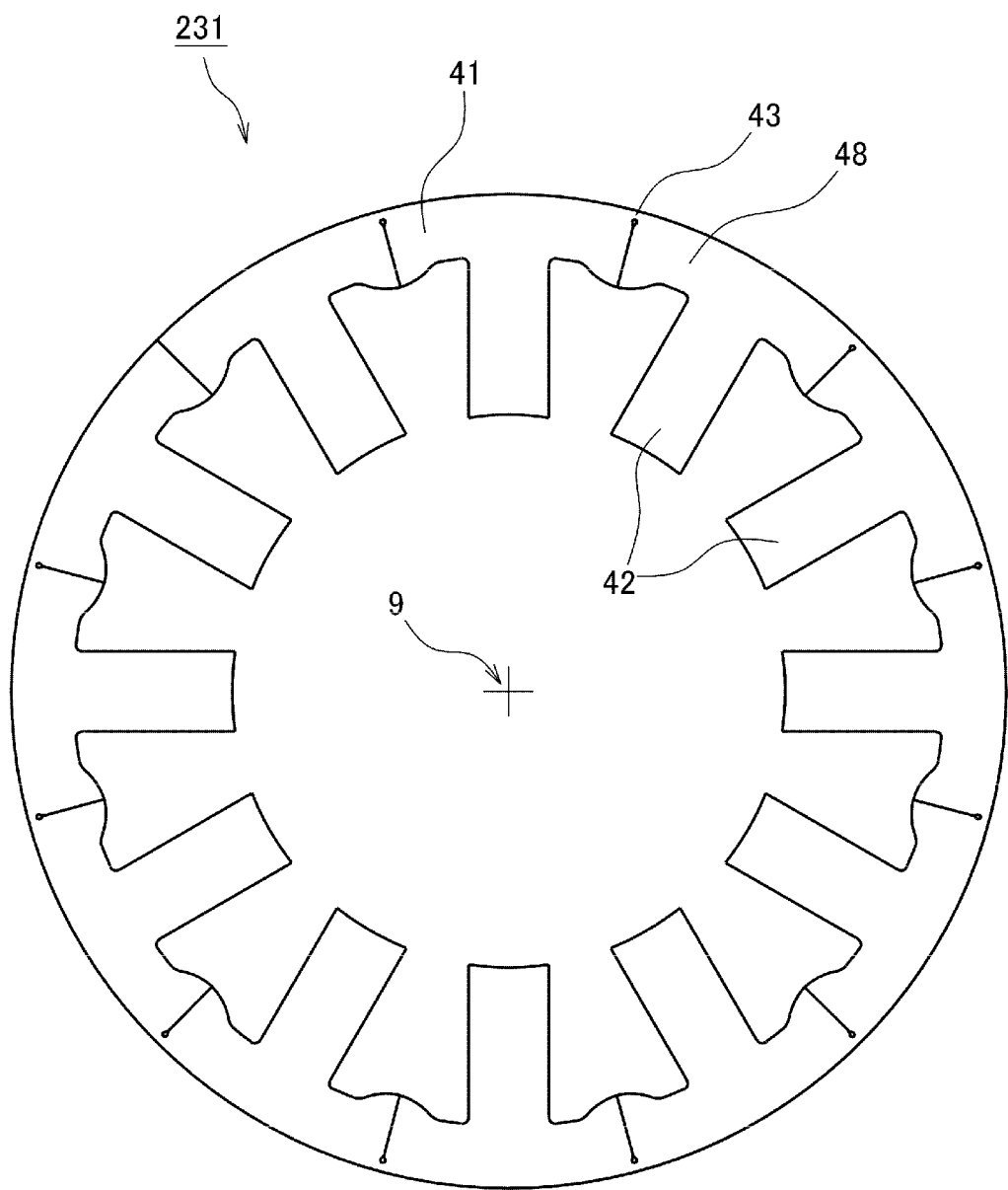
FIG. 3 is a top view of a stator core according to a preferred embodiment of the present invention.

FIG. 3 is a top view of the stator core 231. The stator core 231 is preferably, for example, defined by laminated steel sheets, i.e., a plurality of electromagnetic steel sheets placed one upon another in an axial direction (i.e., a direction parallel to the central axis 9). The direction parallel or substantially parallel to the central axis 9 will hereinafter be referred to by the term "axial direction", "axial", or "axially". As illustrated in FIG. 3, the stator core 231 preferably includes an annular core back 41 and a plurality of teeth 42 arranged to project radially inward (i.e., inward in directions perpendicular to the central axis 9) from the core back 41. The directions perpendicular or substantially perpendicular to the central axis 9 will hereinafter be referred to by the term "radial direction", "radial", or "radially".

The teeth 42 are preferably arranged at regular or substantially regular intervals in a circumferential direction. Each of the teeth 42 is preferably arranged to extend in a radial direction in or substantially in the shape of a quadrangular prism. The core back 41 is arranged to join radially outer end portions of the teeth 42 to one another. As illustrated in FIG. 2, the core back 41 is fixed to an inner circumferential surface of a side wall of the housing 21.

Each insulator 232 is preferably made of, for example, a resin, and is arranged between a corresponding one of the teeth 42 and a corresponding one of the coils 233. Each insulator 232 is attached to a separate one of the teeth 42. A surface of each tooth 42 is partially covered with the insulator 232. Each coil 233 is defined by a conducting wire wound around a separate one of the insulators 232.

Each resin body 234 is preferably defined around a separate one of the teeth 42 by an insert molding process. Each resin body 234 is arranged to cover a corresponding one of the teeth 42, a corresponding one of the insulators 232, and a corresponding one of the coils 233 except for a radially inner end surface of the tooth 42. In addition, portions of the resin body 234 are arranged in gaps defined among the tooth 42, the insulator 232, and the coil 233.

A more detailed structure of the stator unit 23 will be described below.

The lower and upper bearing portions 24 and 25 are arranged to together define a mechanism to rotatably support a shaft 31 of the rotating portion 3. A ball bearing which causes an outer race and an inner race to rotate relative to each other through balls is used as each of the lower and upper bearing portions 24 and 25 according to the present preferred embodiment. Note that other types of bearings, such as, for example, plain bearings, fluid bearings, or the like, may be used in place of the ball bearings in other preferred embodiments of the present invention.

An outer race 241 of the lower bearing portion 24 is fixed to the recessed portion 211 of the housing 21. An outer race 251 of the upper bearing portion 25 is fixed to an edge of the circular hole 221 of the lid portion 22. Meanwhile, inner races 242 and 252 of the lower and upper bearing portions 24 and 25, respectively, are both fixed to the shaft 31. The shaft 31 is thus supported to be rotatable with respect to the housing 21 and the lid portion 22.

The rotating portion 3 according to the present preferred embodiment preferably includes the shaft 31, the rotor core 32, and the magnets 33.

The shaft 31 is arranged in or substantially in the shape of a round column, and is arranged to extend in a vertical direction along the central axis 9. The shaft 31 is arranged to rotate about the central axis 9 while being supported by the lower and upper bearing portions 24 and 25 described above. The shaft 31 includes a head portion 311 arranged to project above the lid portion 22. The head portion 311 is preferably connected to the steering system of the automobile or the like through a power transmission mechanism, such as, for example, a gear.

The rotor core 32 and the magnets 33 are arranged radially inward of the stator unit 23, and are arranged to rotate together with the shaft 31. The rotor core 32 is preferably arranged in or substantially in the shape of a hollow cylinder, and is fixed to the shaft 31. Each of the magnets 33 is preferably fixed to an outer circumferential surface of the rotor core 32 through, for example, an adhesive. A radially outer surface of each magnet 33 defines a pole surface to be opposed to the radially inner end surface of each tooth 42. The magnets 33 are preferably arranged at or substantially at regular intervals in the circumferential direction such that north and south pole surfaces alternate with each other.

Note that, in place of the magnets 33, a single annular magnet in which north and south poles are arranged alternately in the circumferential direction may alternatively be used.

In the motor 1 as described above, once the electrical drive currents are supplied to the coils 233 of the stationary portion 2, radial magnetic flux is generated around each of the teeth 42 of the stator core 231. Then, a circumferential torque is produced by interaction between the magnetic flux of the teeth 42 and that of the magnets 33, so that the rotating portion 3 is caused to rotate about the central axis 9 with respect to the stationary portion 2.

Next, the more detailed structure of the above-described stator unit 23 will now be described below.

Figure 4:
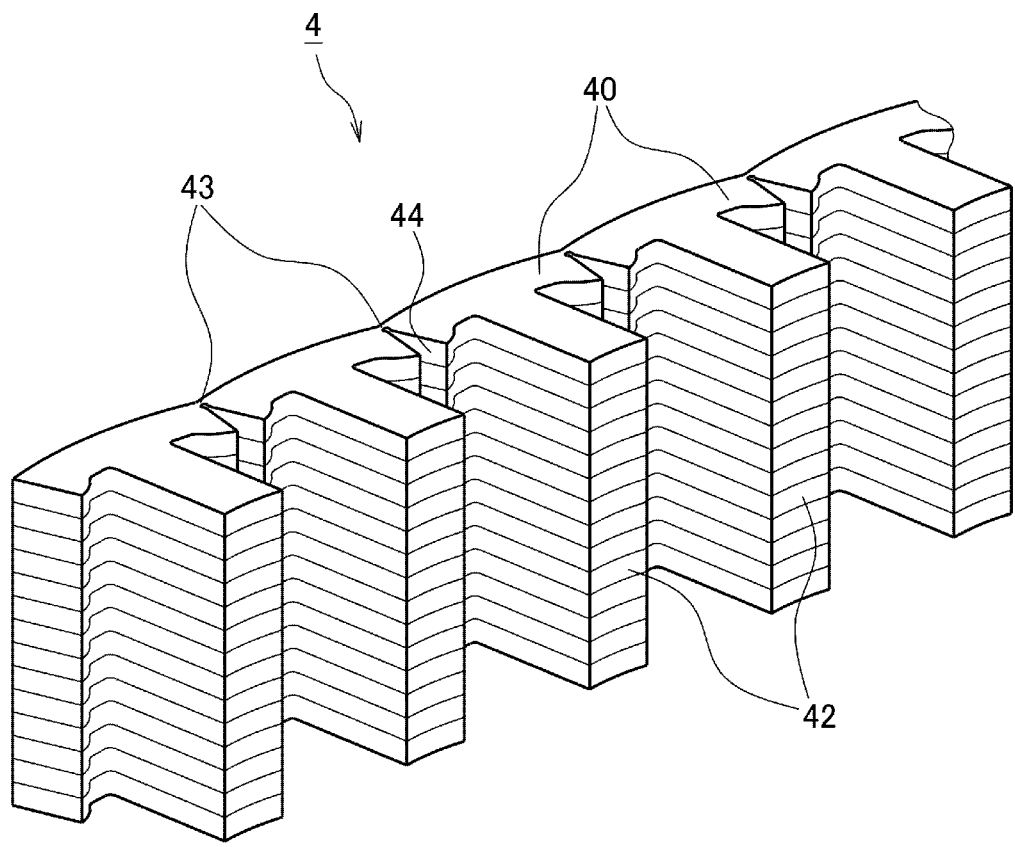
FIG. 4 is a partial perspective view of a straight core according to a preferred embodiment of the present invention.

FIG. 4 is a partial perspective view of a so-called straight core 4, which is the stator core 231 in an expanded state. The stator core 231 according to the present preferred embodiment is preferably obtained by bending the straight core 4 illustrated in FIG. 4 into an annular or substantially annular shape. As illustrated in FIG. 4, the core back 41 of the stator core 231 is divided into a plurality of subcores 40 each of which is arranged for a separate one of the teeth 42. The subcores 40 are connected with one another through flexible joint portions 43 to assume the shape of a band. When the stator unit 23 is manufactured, the joint portions 43 of the straight core 4 as described above are bent to bring end surfaces 44 of every pair of adjacent ones of the subcores 40 into contact with each other. As a result, the annular core back 41 is defined.

Figure 5:
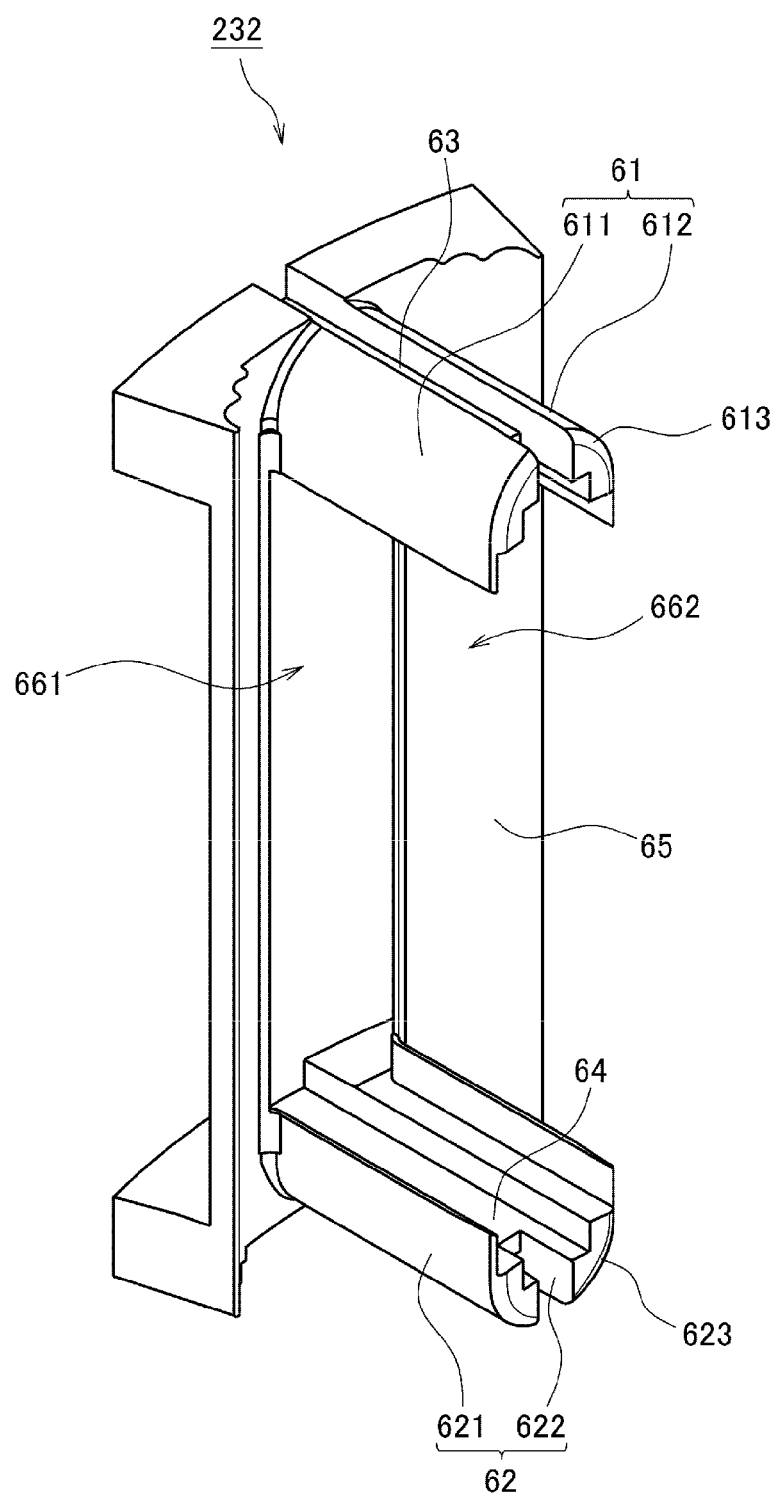
FIG. 5 is a perspective view of an insulator according to a preferred embodiment of the present invention.

FIG. 5 is a perspective view of the insulator 232. As illustrated in FIG. 5, the insulator 232 preferably includes an upper frame portion 61, a lower frame portion 62, an upper joining portion 63, a lower joining portion 64, and an end joining portion 65.

The upper frame portion 61 includes a pair of upper corner covers 611 and 612. Each of the upper corner covers 611 and 612 is arranged to cover a corresponding one of a pair of upper corner portions of the tooth 42, each of the upper corner portions extending in the radial direction. Meanwhile, the lower frame portion 62 includes a pair of lower corner covers 621 and 622. Each of the lower corner covers 621 and 622 is arranged to cover a corresponding one of a pair of lower corner portions of the tooth 42, each of the lower corner portions extending in the radial direction. The upper corner covers 611 and 612 and the lower corner covers 621 and 622 are arranged to extend radially inward from the end joining portion 65 in parallel or substantially in parallel with one another.

An opening portion 661 is preferably defined below the upper corner cover 611 and above the lower corner cover 621. Similarly, an opening portion 662 is preferably defined below the upper corner cover 612 and above the lower corner cover 622. In the present preferred embodiment, no other portion of the insulator 232 is arranged either between the upper corner cover 611 and the lower corner cover 621 or between the upper corner cover 612 and the lower corner cover 622, so that each of the opening portions 661 and 662 has a wide area. Once the insulator 232 is attached to the tooth 42, the opening portions 661 and 662 extend along circumferential side surfaces of the tooth 42.

The upper corner covers 611 and 612 are joined to each other in the circumferential direction through the upper joining portion 63. The upper joining portion 63 is arranged to have an axial thickness smaller than the axial thickness of each of the upper corner covers 611 and 612. A radially inner end portion of the upper joining portion 63 is arranged radially outward of a radially inner end portion of each of the upper corner covers 611 and 612. Therefore, when the resin body 234 is molded during a manufacturing process described below, it is possible to cause a molten resin to flow through gaps on an upper side, a lower side, and a radially inner side of the upper joining portion 63.

The lower corner covers 621 and 622 are joined to each other in the circumferential direction through the lower joining portion 64. The lower joining portion 64 is arranged to have an axial thickness smaller than the axial thickness of each of the lower corner covers 621 and 622. A radially inner end portion of the lower joining portion 64 is arranged radially outward of a radially inner end portion of each of the lower corner covers 621 and 622. Therefore, when the resin body 234 is molded during the manufacturing process described below, it is possible to cause the molten resin to flow through gaps on an upper side, a lower side, and a radially inner side of the lower joining portion 64.

The upper joining portion 63 contributes to increasing rigidity of the upper corner covers 611 and 612 by joining the upper corner covers 611 and 612 to each other. Meanwhile, the lower joining portion 64 contributes to increasing rigidity of the lower corner covers 621 and 622 by joining the lower corner covers 621 and 622 to each other. An increase in the rigidity of the upper corner covers 611 and 612 and of the lower corner covers 621 and 622 makes it easier to attach the insulator 232 to the tooth 42, and to attach the coil 233 to the insulator 232. In addition, the increase in the rigidity of the upper corner covers 611 and 612 and of the lower corner covers 621 and 622 reduces the likelihood of deformation of any of the upper corner covers 611 and 612 and the lower corner covers 621 and 622 due to an injection pressure during an injection molding process. This makes it easier to cause the molten resin to flow along each of the upper corner covers 611 and 612 and the lower corner covers 621 and 622. As a result, the likelihood that the shape of the resin bodies 234 will vary is reduced.

The end joining portion 65 is arranged to join radially outer end portions of the upper corner covers 611 and 612 and the lower corner covers 621 and 622 to one another. The insulator 232 is thus defined by a single continuous monolithic member. Once the insulator 232 is attached to the stator core 231, the end joining portion 65 is in partial contact with both an upper surface and an inner circumferential surface of the core back 41.

Figure 6:
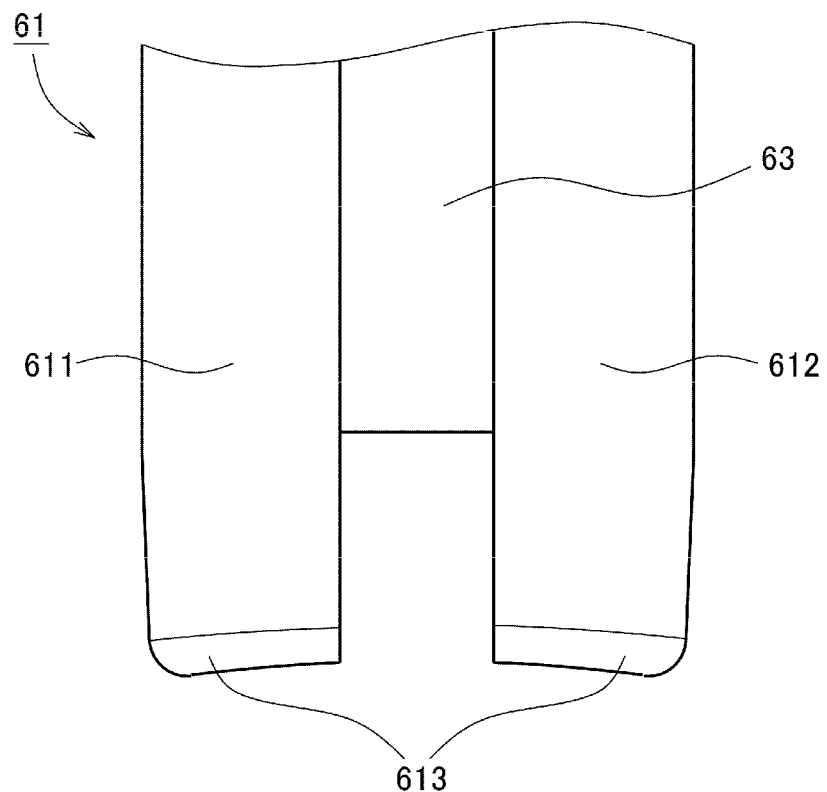
FIG. 6 is a partial top view of an upper frame portion according to a preferred embodiment of the present invention.

FIG. 6 is a partial top view of the upper frame portion 61. As illustrated in FIGS. 5 and 6, a tapered portion 613 is defined in the radially inner end portion of each of the upper corner covers 611 and 612. In other words, a radially inner end portion of a circumferentially outer or an axially outer surface of each of the upper corner covers 611 and 612 is inclined so as to extend further away from the tooth 42 as it extends radially outward. Moreover, as illustrated in FIG. 5, a similar tapered portion 623 is defined in each of the lower corner covers 621 and 622. These tapered portions 613 and 623 preferably make it easier to insert each of the upper corner covers 611 and 612 and the lower corner covers 621 and 622 into the coil 233 in the manufacturing process described below.

Figure 7:
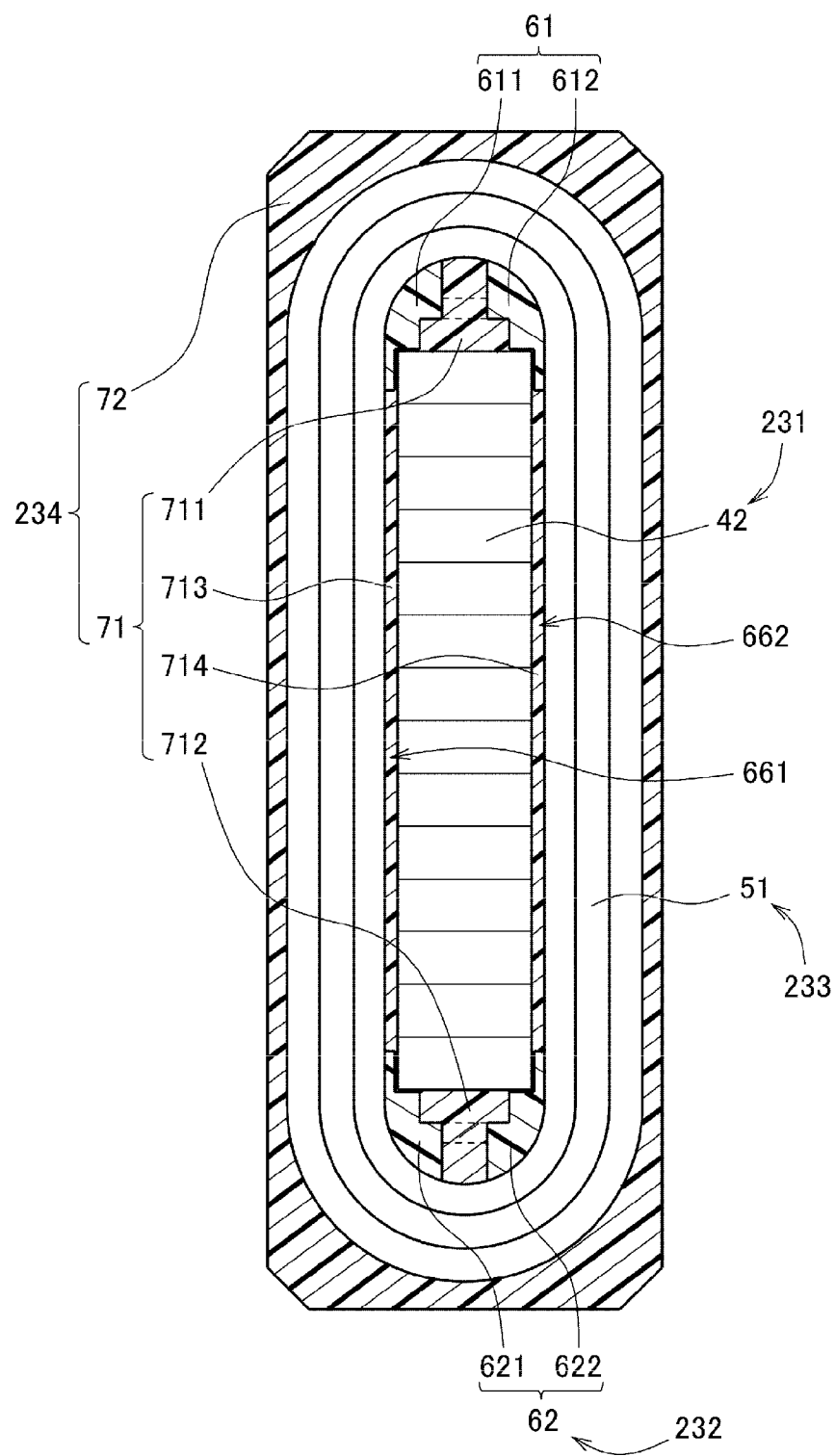
FIG. 7 is a vertical cross-sectional view of a tooth according to a preferred embodiment of the present invention and its vicinity.
Figure 8:
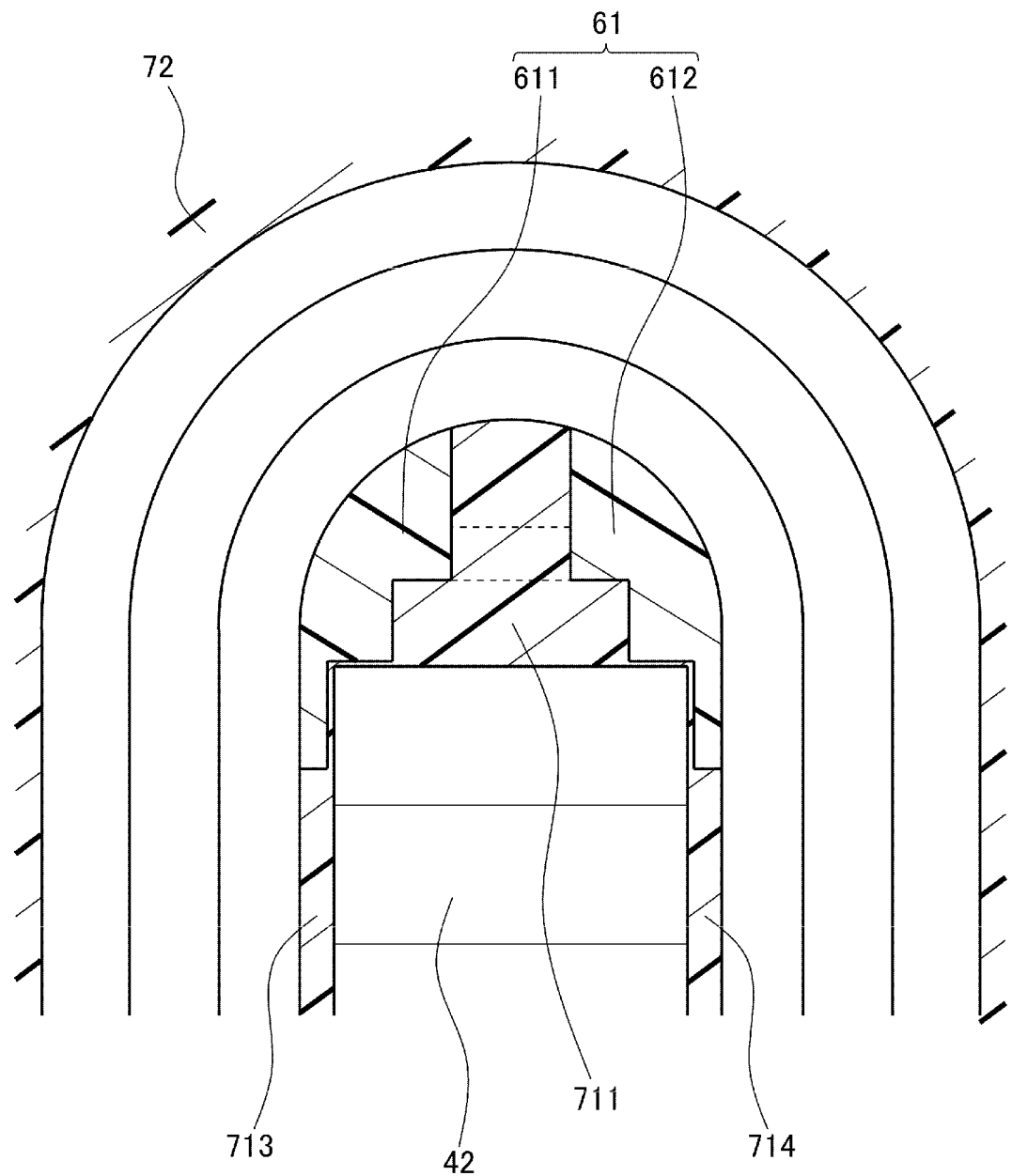
FIG. 8 is a vertical cross-sectional view of an upper end portion of the tooth according to a preferred embodiment of the present invention and its vicinity.
Figure 9:
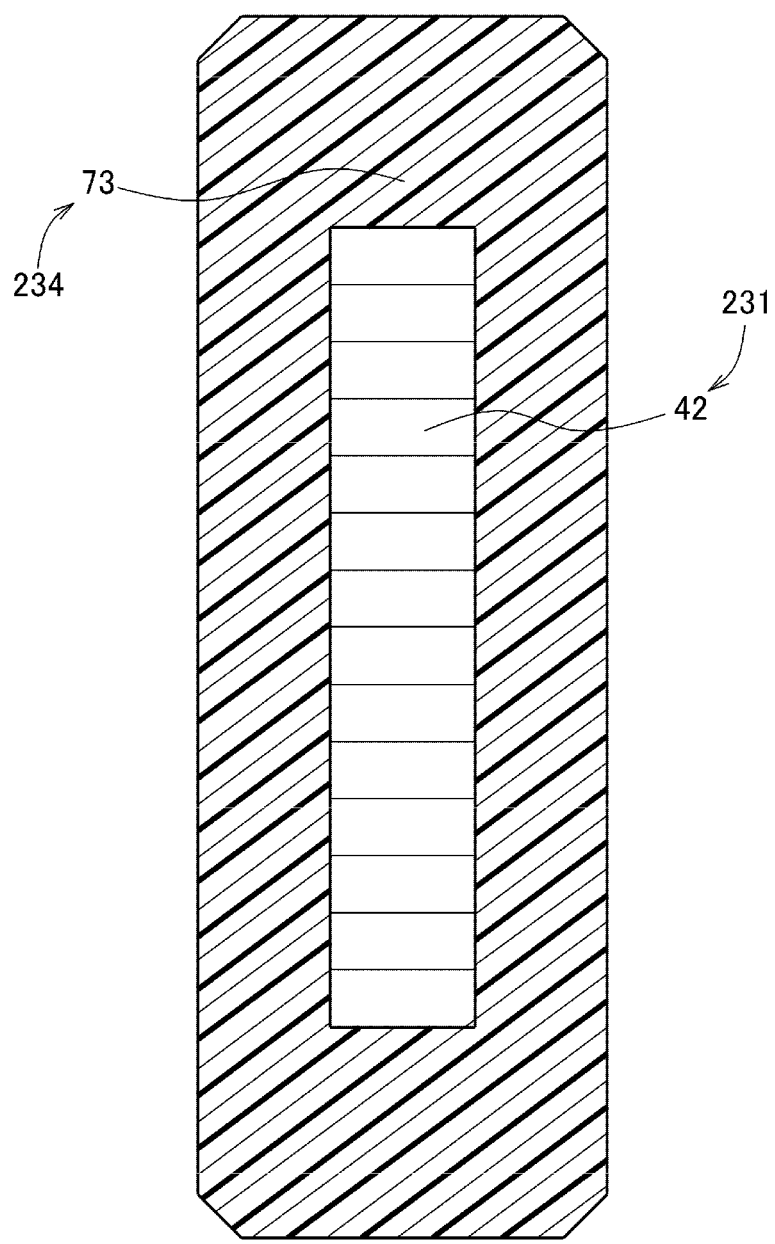
FIG. 9 is a vertical cross-sectional view of the tooth according to a preferred embodiment of the present invention and its vicinity.
Figure 10:
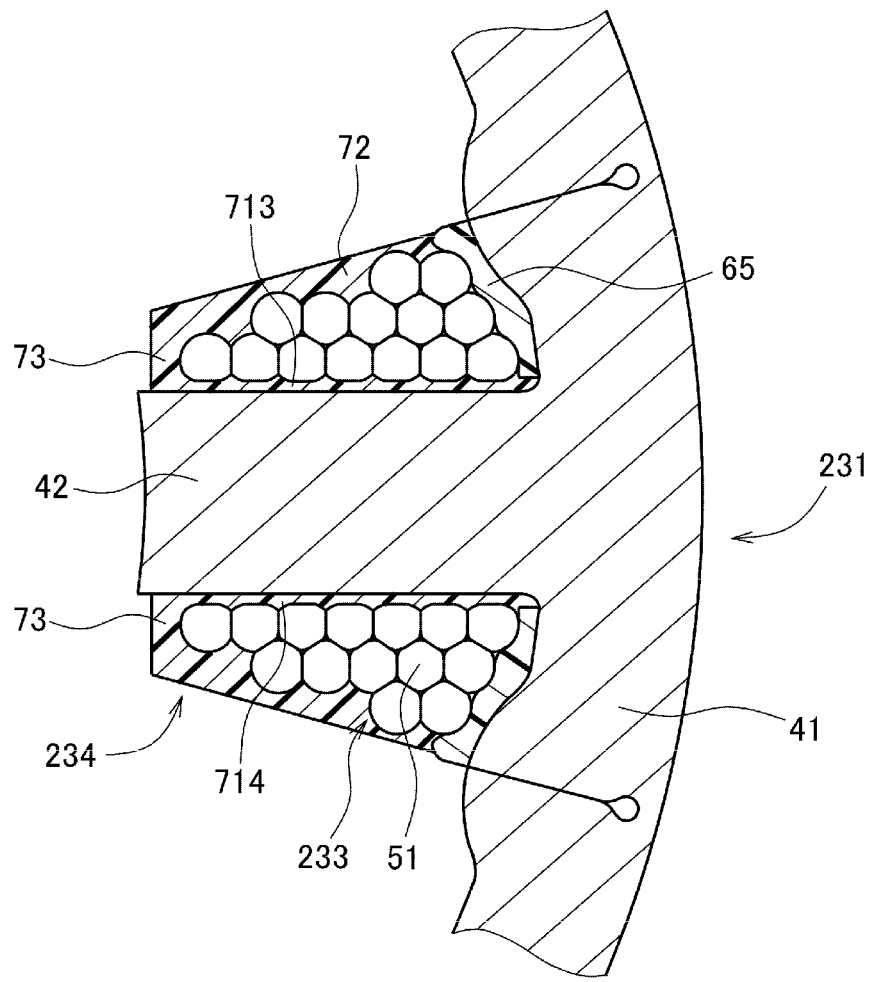
FIG. 10 is a horizontal cross-sectional view of the tooth according to a preferred embodiment of the present invention and its vicinity.

FIG. 7 is a vertical cross-sectional view of one of the teeth 42 and its vicinity taken along line A-A in FIG. 2. FIG. 8 is a diagram illustrating an upper end portion of the tooth 42 illustrated in the cross-sectional view of FIG. 7 and its vicinity in an enlarged form. FIG. 9 is a vertical cross-sectional view of the tooth 42 taken along line B-B in FIG. 2. FIG. 10 is a horizontal cross-sectional view of the tooth 42 taken along line C-C in FIG. 2. As illustrated in FIGS. 7 to 10, the tooth 42, the insulator 232, and the coil 233 are molded by the resin body 234.

The resin body 234 preferably includes an inner resin portion 71 defined inside of the coil 233, and an outer resin portion 72 defined outside of the coil 233. The inner resin portion 71 is arranged between the tooth 42 and the coil 233 and between the tooth 42 and the insulator 232. The outer resin portion 72 is arranged to cover circumferentially outer sides and axially outer sides of the coil 233.

As illustrated in FIGS. 7 and 8, the inner resin portion 71 preferably includes an upper surface resin portion 711, a lower surface resin portion 712, and a pair of side surface resin portions 713 and 714. The upper surface resin portion 711 is defined between the pair of upper corner covers 611 and 612. In addition, the upper surface resin portion 711 is arranged to be in contact with both an upper surface of the tooth 42 and a conducting wire 51 defining the coil 233. The lower surface resin portion 712 is defined between the pair of lower corner covers 621 and 622. In addition, the lower surface resin portion 712 is arranged to be in contact with both a lower surface of the tooth 42 and the conducting wire 51 defining the coil 233.

The side surface resin portion 713 is defined in the opening portion 661 between the upper corner cover 611 and the lower corner cover 621. The side surface resin portion 714 is defined in the opening portion 662 between the upper corner cover 612 and the lower corner cover 622. Each of the side surface resin portions 713 and 714 is arranged to be in contact with both a circumferential side surface of the tooth 42 and the conducting wire 51 defining the coil 233.

Once the drive current is supplied to the conducting wire 51, heat is generated in the coil 233. In the case of the motor 1, however, the inner resin portion 71 is preferably arranged to fill in all of the gaps between the tooth 42 and the coil 233, and therefore, the heat generated in the coil 233 is efficiently transferred to the tooth 42 through the inner resin portion 71. The heat transferred to the tooth 42 is emitted out of the motor 1 through the core back 41 and the housing 21. As a result, the motor 1 is cooled.

In particular, in the present preferred embodiment, the opening portions 661 and 662 are defined entirely between the upper corner cover 611 and the lower corner cover 621 and between the upper corner cover 612 and the lower corner cover 622, respectively. In addition, the side surface resin portions 713 and 714 are defined in the opening portions 661 and 662, respectively. Thus, a larger area of a path along which the heat is transferred from the conducting wire 51 to the tooth 42 is secured. As a result, dissipation of the heat out of the motor 1 is further promoted.

As illustrated in FIG. 8, the inner resin portion 71 is arranged not only between the tooth 42 and the coil 233 but also between the tooth 42 and each of the upper corner covers 611 and 612. Similarly, the inner resin portion 71 is arranged between the tooth 42 and each of the lower corner covers 621 and 622 as well. Thus, an even larger area of the path along which the heat is transferred from the conducting wire 51 to the tooth 42 through the inner resin portion 71 is secured. As a result, the dissipation of the heat out of the motor 1 is further promoted.

Furthermore, the coil 233 is arranged to be in contact with not only the inner resin portion 71 but also with the outer resin portion 72. Therefore, heat generated in the coil 233 is transferred to the outer resin portion 72. As illustrated in FIGS. 9 and 10, the outer resin portion 72 is preferably arranged to be continuous with the inner resin portion 71 through a connecting resin portion 73 defined radially inward of the coil 233 to define a single monolithic member. Therefore, a portion of the heat transferred to the outer resin portion 72 is transferred to the inner resin portion 71 through the connecting resin portion 73, and emitted out of the motor 1 through the stator core 231 and the housing 21.

The connecting resin portion 73 preferably contributes to preventing loose windings, corrosion, and breakage in a radially inner end portion or outer end portion of the coil 233. Furthermore, because the inner resin portion 71 and the outer resin portion 72 are arranged to be continuous with each other through the connecting resin portion 73, it is possible to mold the resin body 234 at once.

Furthermore, as illustrated in FIG. 2, in the present preferred embodiment, the resin body 234 is arranged to be in contact with the core back 41 of the stator core 231 as well. Therefore, heat transferred to the outer resin portion 72 is preferably transferred directly to the core back 41 without passing through the inner resin portion 71. In the motor 1, there are thus a plurality of paths along which the heat is transferred from the coil 233 to the stator core 231 through the resin body 234. The dissipation of the heat out of the motor 1 is thus further promoted.

A resin having a high thermal conductivity is preferably used for the resin body 234. Thermosetting resins generally have higher thermal conductivities than those of thermoplastic resins. Therefore, the resin body 234 is preferably made of, for example, a thermosetting resin. Use of the thermosetting resin for the resin body 234 enables the heat to be transferred from the conducting wire 51 to the stator core 231 more efficiently.

The coil 233 is compressed in the circumferential direction or in the axial direction at step S2 in the manufacturing process described below. As a result, as illustrated in FIG. 10, at least some turns of the conducting wire 51 preferably have hexagonal or substantially hexagonal cross-sections. When gaps between adjacent turns of the conducting wire 51 in the coil 233 are reduced, heat is transferred between the turns of the conducting wire 51 with improved efficiency. As a result, even heat which is generated in portions of the conducting wire 51 which are not in direct contact with the resin body 234 is efficiently transferred to the inner resin portion 71 or the outer resin portion 72. The dissipation of the heat out of the motor 1 is further promoted. Furthermore, the reduced gaps between adjacent turns of the conducting wire 51 make it possible to increase the number of turns of the conducting wire 51, that is, to increase the space factor of the coil 233.

With the size of the motor 1 being the same, an increase in the space factor of each coil 233 leads to an improvement in the power of the motor 1. Meanwhile, with the power of the motor 1 being the same, an increase in the space factor of each coil 233 makes it possible to decrease the size of the motor 1. The heat generated in each coil 233 of the motor 1 according to the present preferred embodiment is efficiently emitted to an outside. Therefore, adoption of the structure according to the present preferred embodiment leads to a motor having a small size, a high power, and a high heat dissipation efficiency.

Preferred Procedure for Manufacturing Stator Unit

Figure 11:
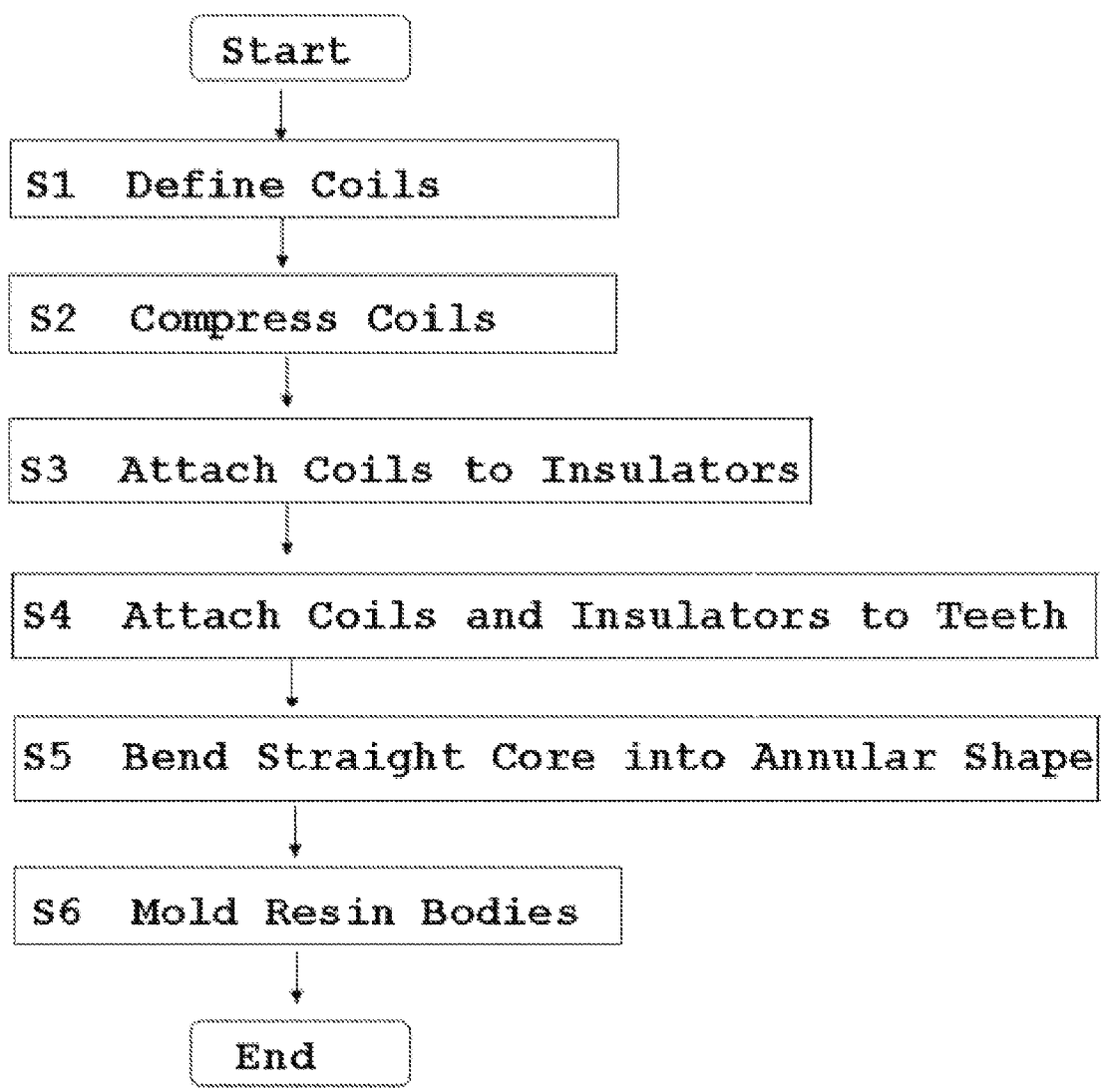
FIG. 11 is a flowchart illustrating a portion of a process of manufacturing the motor according to a preferred embodiment of the present invention.

FIG. 11 is a flowchart illustrating a portion of a process of manufacturing the above-described motor 1 in accordance with a preferred embodiment of the present invention. A procedure of manufacturing the stator unit 23 of the motor 1 will now be described below with reference to FIG. 11.

When the stator unit 23 is manufactured, a spool (not shown) is preferably first prepared. Then, the conducting wire 51 is wound around the spool to define each coil 233 (step S1). For example, a metallic jig having a rigidity higher than that of the insulators 232 is preferably used as the spool.

Next, each coil 233 is preferably compressed at least in part (step S2). For example, a circumferential or axial pressure is applied to the conducting wire 51 wound on the spool. The gaps between adjacent turns of the conducting wire 51 in each coil 233 are reduced, so that the thermal conductivity and the space factor of the coil 233 are improved.

Next, the coils 233 are attached to the respective insulators 232 (step S3). Here, each coil 233 arranged in an annular shape is removed from the spool, and the insulator 232 is inserted into the coil 233. As a result, the insulator 232 holds the coil 233.

Figure 12:
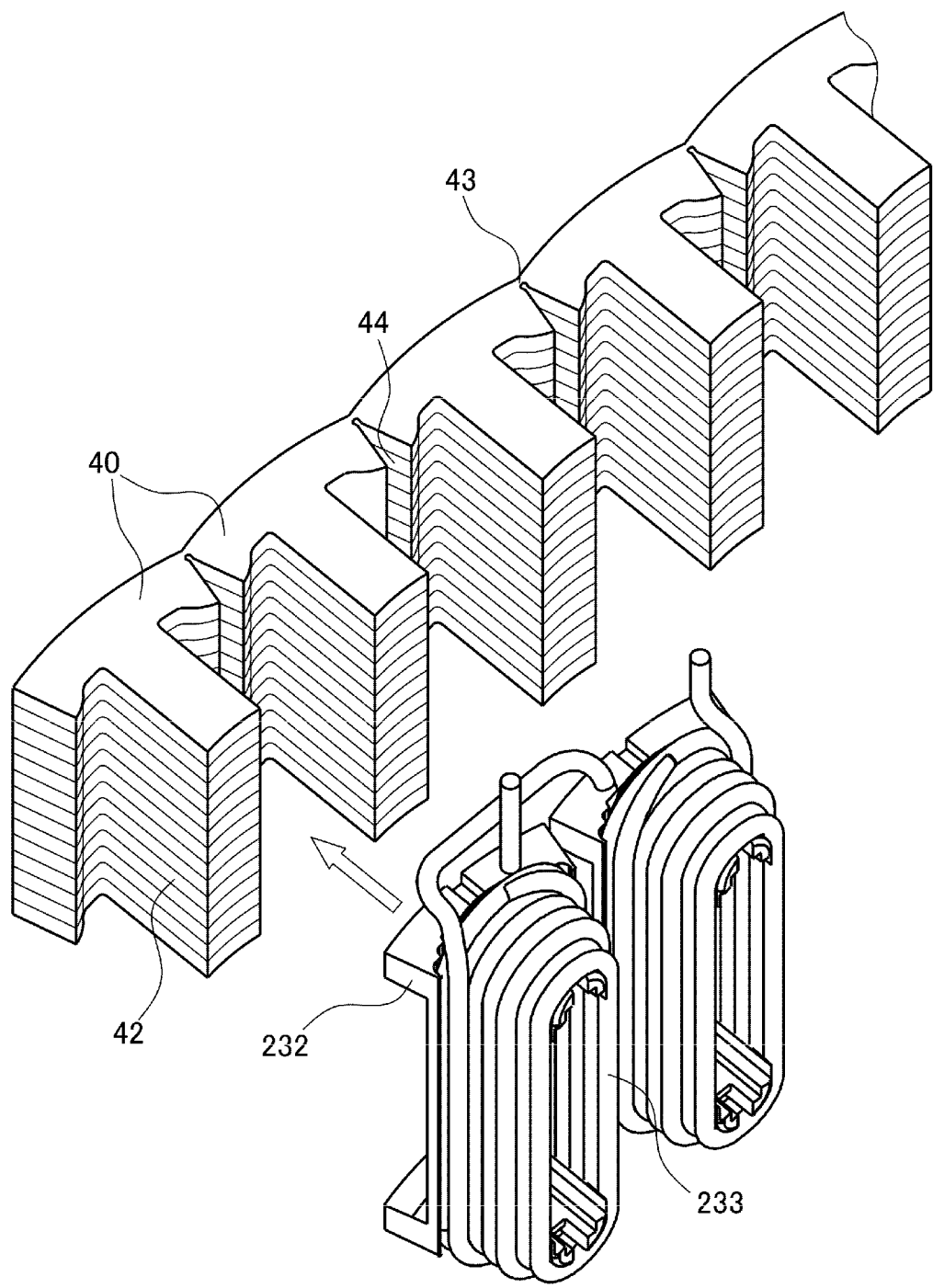
FIG. 12 is a perspective view illustrating a manner in which insulators are attached to teeth according to a preferred embodiment of the present invention.

Further, the insulators 232 holding the respective coils 233 are attached to the respective teeth 42 (step S4). FIG. 12 is a perspective view illustrating a manner in which the insulators 232 are attached to the respective teeth 42. As illustrated in FIG. 12, in the present preferred embodiment, the insulators 232 are preferably attached to the respective teeth 42 of the straight core 4 in the expanded state.

Each insulator 232 is attached to a corresponding one of the teeth 42 from the radial inside, i.e., from a tip side of the tooth 42. A radially inner end portion of each of the teeth 42 according to the present preferred embodiment does not extend in the circumferential direction. That is, the circumferential width of the radially inner end portion of the tooth 42 and the circumferential width of a remaining portion of the tooth 42 are preferably arranged to be equal or substantially equal to each other. Therefore, it is easy to insert each tooth 42 into the coil 233 and the insulator 232.

Thereafter, the straight core 41 is bent into the annular or substantially annular shape (step S5). Specifically, each joint portion 43 of the straight core 4 is bent to bring the end surfaces 44 of every pair of adjacent ones of the subcores 40 into contact with each other. As a result, the stator core 231 arranged in the annular or substantially annular shape is obtained.

Finally, the resin bodies 234 are defined by the insert molding process (step S6). Here, an assembly including the stator core 231, the insulators 232, and the coils 233 is preferably arranged in a cavity defined by a pair of molds. Then, the molten resin is injected into the cavity within the molds. The molten resin preferably fills in all of the gaps between the teeth 42 and the respective coils 233 and gaps outside of the coils 233, and then hardens. Each resin body 234 including the inner resin portion 71, the outer resin portion 72, and the connecting resin portion 73 is thus molded as a single monolithic member.

Modifications of Preferred Embodiments

While preferred embodiments of the present invention have been described above, it will be understood that the present invention is not limited to the above-described preferred embodiments.

Figure 13:
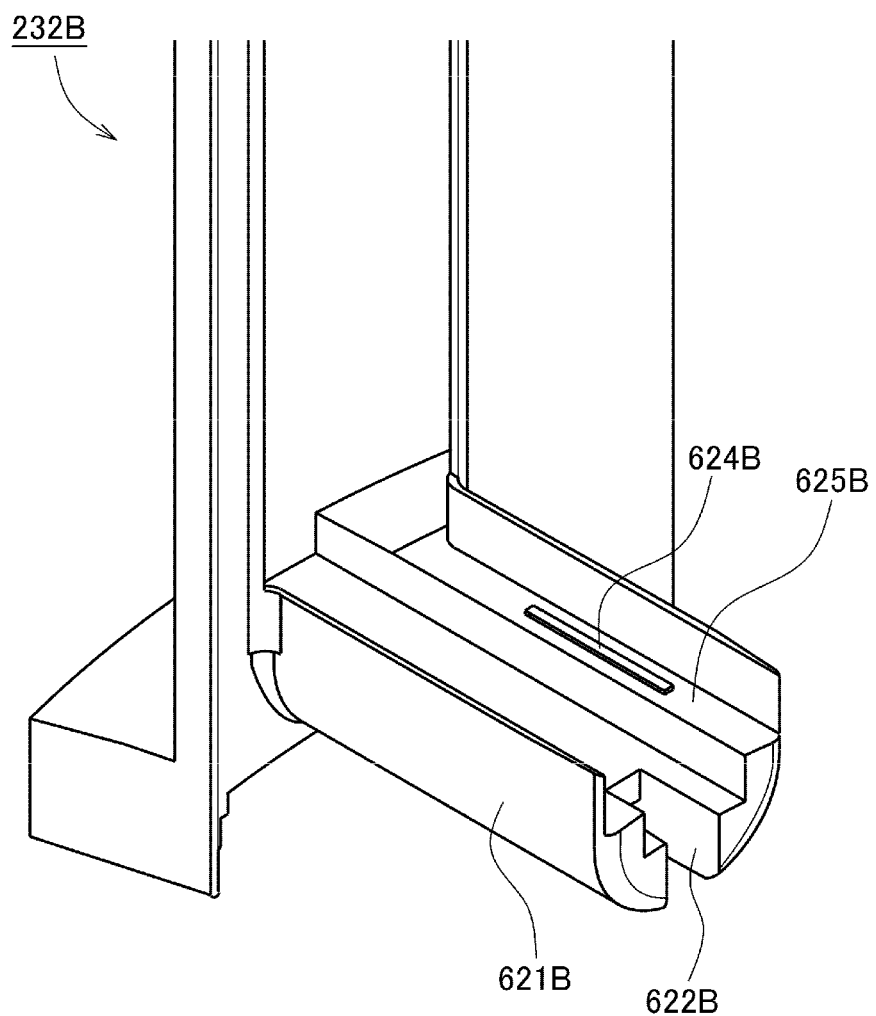
FIG. 13 is a partial perspective view of an insulator according to a preferred embodiment of the present invention.

FIG. 13 is a partial perspective view of an insulator 232B according to a modification of an above-described preferred embodiment. In an example of FIG. 13, a surface of a lower corner cover 622B which is opposed to a tooth is arranged to have an uneven shape. Specifically, the surface of the lower corner cover 622B preferably includes a contact region 624B arranged to be in contact with the tooth and a recessed region 625B arranged to be recessed relative to the contact region 624B. Each of another lower corner cover 621B and a pair of upper corner covers is also arranged to have a similar uneven shape. The recessed region 625B and a surface of the tooth are thus spaced from each other. Accordingly, when a resin body is molded, a molten resin is allowed to flow through the recessed region 625B. As a result, the resin body can be molded such that a side surface resin portion and an upper surface resin portion or a lower surface resin portion are arranged to be continuous with each other through the recessed region 625B.

Figure 14:
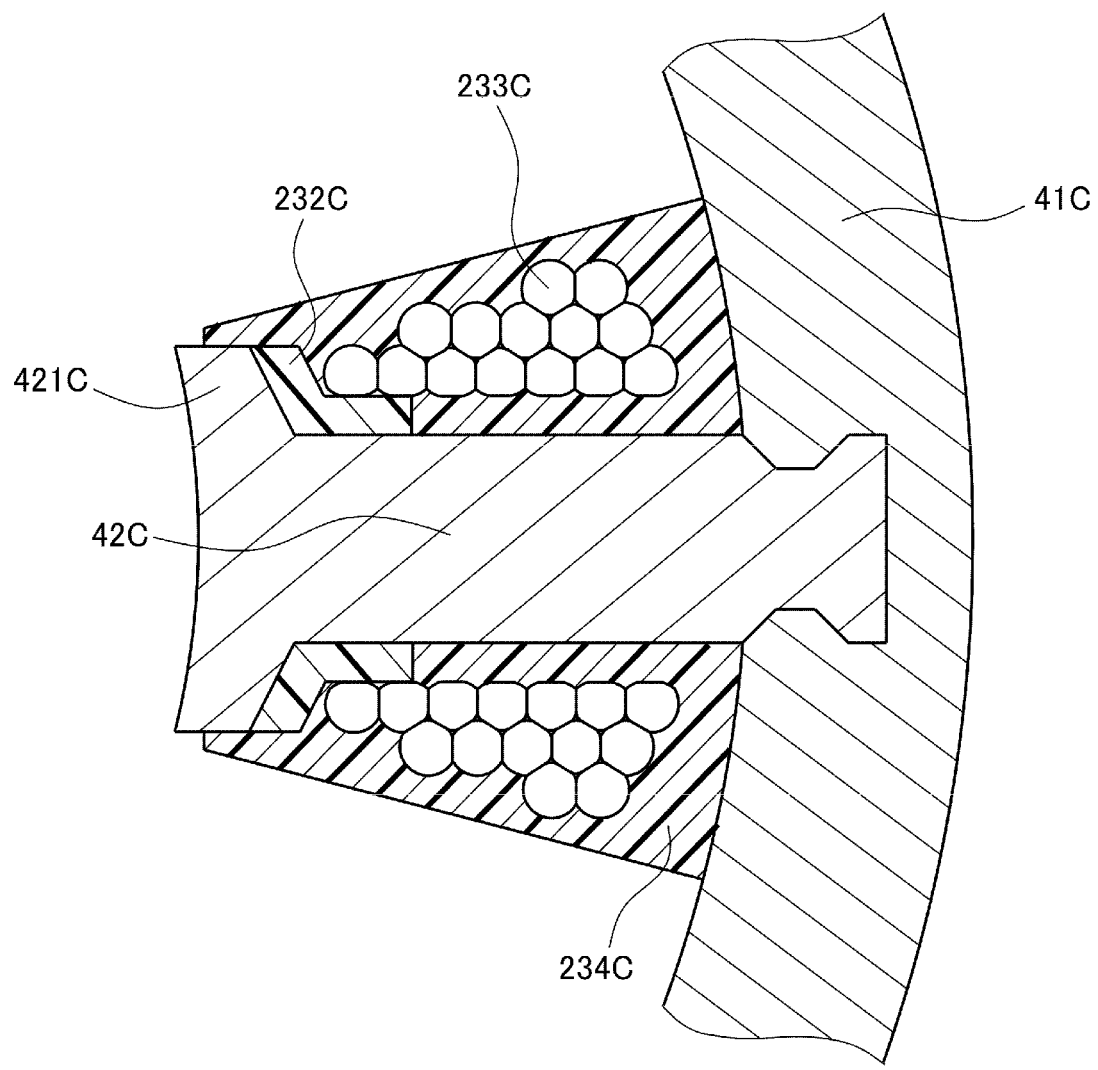
FIG. 14 is a horizontal cross-sectional view of a tooth according to a preferred embodiment of the present invention and its vicinity.

FIG. 14 is a horizontal cross-sectional view of one of teeth 42C and its vicinity of a motor according to another modification of the above-described preferred embodiment. In an example of FIG. 14, a flange portion 421C extending in the circumferential direction is preferably arranged at a radially inner end portion of the tooth 42C. Moreover, in the example of FIG. 14, a core back 41C and the tooth 42C are defined by separate members. Furthermore, a radially outer end portion of the tooth 42C is fixed to the core back 41C. Furthermore, the tooth 42C, an insulator 232C, and a coil 233C are molded within a resin body 234C.

In the case of a structure illustrated in FIG. 14, it is possible to attach the insulator 232C and the coil 233C previously defined to the tooth 42C from the radial outside before the tooth 42C is fixed to the core back 41C. Therefore, as in the above-described preferred embodiment, it is possible to improve the thermal conductivity and the space factor of the coil 233C by compressing the coil 233C using the spool.

In the case of the structure illustrated in FIG. 14, an end joining portion of the insulator 232C may be arranged radially outward of an upper frame portion and a lower frame portion of the insulator 232C. For example, a portion of the insulator 232C which is arranged to be in contact with the flange portion 421C of the tooth 42C may be defined as the end joining portion. Moreover, in the case of the structure illustrated in FIG. 14, tapered portions similar to those illustrated in FIG. 6 may be defined in radially outer end portions of the upper and lower frame portions. The tapered portions make it easier to attach the coil 233C to the insulator 232C.

A stator unit illustrated in FIG. 14 is preferably manufactured in a procedure generally similar to the procedure illustrated in FIG. 11. Note, however, that in step S4, the coil 233C and the insulator 232C are preferably attached to the tooth 42C from the radial outside. Also note that a step of fixing the radially outer end portion of the tooth 42C to the core back 41C is added after step S4.

The stator core may be defined by bending a straight core 4 into the annular or substantially annular shape as in the above-described preferred embodiment. Alternatively, an annular or substantially annular core back of the stator core may be defined by combining a plurality of pieces together. Also, the stator core may include an annular or substantially annular core back with no joints.

Opening portions of the insulator may be defined either entirely between the upper and lower frame portions as in the above-described preferred embodiment, or only partially therebetween. For example, the insulator may include a reinforcing rib between the upper and lower frame portions.

A connecting resin portion may be arranged either radially inward of the coil as in the above-described preferred embodiment or radially outward of the coil. Also, connecting resin portions may be arranged both radially inward and radially outward of the coil.

Attachment of the coil to the insulator may be performed either before or after attachment of the insulator to the tooth. For example, the coil may be attached to the insulator after the insulator is attached to the tooth.

Also, the circumferential width of the tooth may be decreased in the radially inner end portion of the tooth. That is, the circumferential width of the radially inner end portion of the tooth may be arranged to be smaller than the circumferential width of a remaining portion of the tooth.

Also, an outer circumferential surface of the core back may be arranged to have either a circular shape or a polygonal shape in a plan view.

Note that the detailed shape of any member may be different from the shape thereof as illustrated in the accompanying drawings of the present application.

Also note that features of the above-described preferred embodiments and the modifications thereof may be combined appropriately as long as no conflict arises.

Preferred embodiments of the present invention are applicable to motors and methods of manufacturing the motors.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A motor comprising a stationary portion and a rotating portion; wherein the stationary portion includes: a plurality of teeth each having a shape of a column extending in a radial direction with respect to a central axis extending in a vertical direction, each tooth including a pair of circumferential side surfaces extending in an axial direction; insulators each arranged to cover portions of a surface of a separate one of the teeth; and coils each defined by a conducting wire wound around a separate one of the insulators; the rotating portion is arranged radially inward of the teeth, the insulators, and the coils, and is supported to be rotatable about the central axis with respect to the stationary portion; each insulator includes: an upper frame portion arranged to cover a pair of upper corner portions of a corresponding one of the teeth, each upper corner portion extending in the radial direction; a lower frame portion arranged to cover a pair of lower corner portions of the corresponding tooth, each lower corner portion extending in the radial direction; and an opening portion arranged to extend along the circumferential side surfaces of the corresponding tooth below the upper frame portion and above the lower frame portion; the stationary portion further includes resin bodies defined integrally with one another to define a single monolithic member, each resin body including: an inner resin portion arranged between a corresponding one of the teeth and a corresponding one of the coils, and between the corresponding tooth and a corresponding one of the insulators; an outer resin portion arranged to cover circumferentially outer sides and axially outer sides of the corresponding coil; and a connecting resin portion arranged on a radially outer side or a radially inner side of the corresponding coil; the inner and outer resin portions are arranged to be continuous with each other through the connecting resin portion; the inner resin portion is arranged to be in contact with both the circumferential side surfaces of the corresponding tooth and the conducting wire in the opening portion; the upper frame portion includes a pair of upper corner covers each arranged to extend in the radial direction; the lower frame portion includes a pair of lower corner covers each arranged to extend in the radial direction; each insulator includes: an upper joining portion arranged to on the upper corner covers to each other in a circumferential direction; and a lower joining portion arranged to-join the lower corner covers to each other in the circumferential direction;

the upper joining portion has axial and radial thicknesses smaller than axial and radial thickness of each of the upper corner covers; and the lower joining portion has axial and radial thicknesses smaller than axial and radial thicknesses of each of the lower corner covers; and a portion of the coils is not axially overlapped by either of the upper joining portion and the lower joining portion.

2. The motor according to claim 1, wherein
the inner resin portion includes: a side surface resin portion defined in the opening portion; an upper surface resin portion arranged to be in contact with both an upper surface of the corresponding tooth and the conducting wire; and a lower surface resin portion arranged to be in contact with both a lower surface of the corresponding tooth and the conducting wire; one of the upper and lower frame portions includes: a contact region arranged to be in contact with the corresponding tooth; and a recessed region arranged to be recessed relative to the contact region; and the side surface resin portion and one of the upper and lower surface resin portions are arranged to be continuous with each other through the recessed region.

3. The motor according to claim 1, wherein
the inner resin portion includes:
a side surface resin portion defined in the opening portion;
an upper surface resin portion arranged to be in contact with both an upper surface of the corresponding tooth and the conducting wire; and
a lower surface resin portion arranged to be in contact with both a lower surface of the corresponding tooth and the conducting wire;
one of the upper and lower frame portions includes:
a contact region arranged to be in contact with the corresponding tooth; and
a recessed region arranged to be recessed relative to the contact region; and
the side surface resin portion and one of the upper and lower surface resin portions are arranged to be continuous with each other through the recessed region.

4. The motor according to claim 1, wherein
a radially inner end portion of the upper joining portion is positioned radially outward of a radially inner end portion of each of the upper corner covers; and
a radially inner end portion of the lower joining portion is positioned radially outward of a radially inner end portion of each of the lower corner covers.

5. The motor according to claim 4, wherein
the inner resin portion includes:
a side surface resin portion defined in the opening portion;
an upper surface resin portion arranged to be in contact with both an upper surface of the corresponding tooth and the conducting wire; and
a lower surface resin portion arranged to be in contact with both a lower surface of the corresponding tooth and the conducting wire;
one of the upper and lower frame portions includes:
a contact region arranged to be in contact with the corresponding tooth; and
a recessed region arranged to be recessed relative to the contact region; and
the side surface resin portion and one of the upper and lower surface resin portions are arranged to be continuous with each other through the recessed region.

6. The motor according to claim 1, wherein each insulator includes an end joining portion arranged to join radially outer end portions or radially inner end portions of the upper and lower frame portions to each other.

7. The motor according to claim 6, wherein
the inner resin portion includes:
a side surface resin portion defined in the opening portion;
an upper surface resin portion arranged to be in contact with both an upper surface of the corresponding tooth and the conducting wire; and
a lower surface resin portion arranged to be in contact with both a lower surface of the corresponding tooth and the conducting wire;
one of the upper and lower frame portions includes:
a contact region arranged to be in contact with the corresponding tooth; and
a recessed region arranged to be recessed relative to the contact region; and
the side surface resin portion and one of the upper and lower surface resin portions are arranged to be continuous with each other through the recessed region.

8. The motor according to claim 7, wherein each resin body is made of a thermosetting resin.

9. The motor according to claim 1, wherein
a radially inner end portion of each tooth is arranged to have a circumferential width equal to or smaller than a circumferential width of a remaining portion of the tooth;
the stationary portion includes an annular core back arranged to join radially outer end portions of the teeth to one another; and
each resin body and the core back are arranged to be in contact with each other.

10. The motor according to claim 9, wherein one of the upper and lower frame portions includes a tapered portion defined in a radially inner end portion thereof.

11. The motor according to claim 10, wherein
the inner resin portion includes:
  a side surface resin portion defined in the opening portion;
  an upper surface resin portion arranged to be in contact with both an upper surface of the corresponding tooth and the conducting wire; and
  a lower surface resin portion arranged to be in contact with both a lower surface of the corresponding tooth and the conducting wire;
one of the upper and lower frame portions includes:
  a contact region arranged to be in contact with the corresponding tooth; and
  a recessed region arranged to be recessed relative to the contact region; and
the side surface resin portion and one of the upper and lower surface resin portions are arranged to be continuous with each other through the recessed region.

12. The motor according to claim 1, wherein
each tooth includes a flange portion arranged to extend in a circumferential direction at a radially inner end portion thereof;
the stationary portion further includes an annular core back independent of the teeth; and
a radially outer end portion of each tooth is fixed to the core back.

13. The motor according to claim 12, wherein one of the upper and lower frame portions includes a tapered portion defined in a radially outer end portion thereof.

14. The motor according to claim 13, wherein
the inner resin portion includes:
  a side surface resin portion defined in the opening portion;
  an upper surface resin portion arranged to be in contact with both an upper surface of the corresponding tooth and the conducting wire; and
  a lower surface resin portion arranged to be in contact with both a lower surface of the corresponding tooth and the conducting wire;
one of the upper and lower frame portions includes:
  a contact region arranged to be in contact with the corresponding tooth; and
  a recessed region arranged to be recessed relative to the contact region; and
the side surface resin portion and one of the upper and lower surface resin portions are arranged to be continuous with each other through the recessed region.

15. The motor according to claim 4, wherein each insulator includes an end joining portion arranged to join radially outer end portions or radially inner end portions of the upper and lower frame portions to each other.

16. The motor according to claim 15, wherein
the inner resin portion includes:
  a side surface resin portion defined in the opening portion;
  an upper surface resin portion arranged to be in contact with both an upper surface of the corresponding tooth and the conducting wire; and
  a lower surface resin portion arranged to be in contact with both a lower surface of the corresponding tooth and the conducting wire;
one of the upper and lower frame portions includes:
  a contact region arranged to be in contact with the corresponding tooth; and
  a recessed region arranged to be recessed relative to the contact region; and
the side surface resin portion and one of the upper and lower surface resin portions are arranged to be continuous with each other through the recessed region.

* * * * *